(12) United States Patent
Jaggi (10) Patent No.: US 9,872,159 B2
(45) Date of Patent: Jan. 16, 2018

(54) SYSTEMS AND METHODS FOR DELIVERING PRODUCT INFORMATION TO A MOBILE DEVICE

(71) Applicant: GENERAL MOTORS LLC, Detroit, MI (US)

(72) Inventor: Kunal Jaggi, Ferndale, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 0 days.

(21) Appl. No.: 15/092,822

(22) Filed: Apr. 7, 2016

(65) Prior Publication Data

US 2017/0295478 A1 Oct. 12, 2017

(51) Int. Cl.
| | | |
|---|---|---|
| *H04L 29/06* | (2006.01) | |
| *H04W 4/18* | (2009.01) | |
| *H04W 4/00* | (2009.01) | |
| *H04W 4/02* | (2009.01) | |
| *H04B 1/3822* | (2015.01) | |
| *G06F 17/30* | (2006.01) | |

(52) U.S. Cl.
CPC ........ *H04W 4/18* (2013.01); *G06F 17/30477* (2013.01); *G06F 17/30554* (2013.01); *H04B 1/3822* (2013.01); *H04W 4/008* (2013.01); *H04W 4/021* (2013.01)

(58) Field of Classification Search
CPC ....... H04W 4/18; H04W 4/008; H04W 4/021; G06F 17/30554; G06F 17/30477; H04B 1/3822

See application file for complete search history.

(56) References Cited

U.S. PATENT DOCUMENTS

| | | | | |
|---|---|---|---|---|
| 9,178,994 B2* | 11/2015 | Tuchman | ................ | H04M 3/51 |
| 2011/0043327 A1* | 2/2011 | Baarman | ................ | H02J 5/005 |
| | | | | 340/5.8 |
| 2015/0170209 A1* | 6/2015 | Smith | ................ | G06Q 30/0267 |
| | | | | 705/14.64 |
| 2015/0195673 A1* | 7/2015 | Rantapuska | .......... | H04W 4/008 |
| | | | | 455/3.05 |
| 2016/0063507 A1* | 3/2016 | Gao | ..................... | G06Q 30/012 |
| | | | | 705/302 |
| 2016/0253624 A1* | 9/2016 | Sims | ..................... | H04W 4/008 |

\* cited by examiner

*Primary Examiner* — Ajit Patel
(74) *Attorney, Agent, or Firm* — Lorenz & Kopf, LLP (57) ABSTRACT

Methods and systems are provided for delivering product information to a mobile device. A beacon uses a transmitter to transmit a product identification key to the mobile device over a first communication channel. A remote server has a database of detailed product information corresponding to the product identification key. An application on the mobile device to requests the detailed product information from the remote server over a second communication channel. The remote server transmits the detailed product information to the mobile device over the second communication channel and the detailed product information is displayed on the mobile device.

16 Claims, 7 Drawing Sheets

SYSTEMS AND METHODS FOR DELIVERING PRODUCT INFORMATION TO A MOBILE DEVICE

TECHNICAL FIELD

The technical field generally relates to information delivery systems, and more particularly relates to methods and systems for providing product information to mobile devices using proximity based beacons.

BACKGROUND

For years, companies have pursued new ways to enhance a shopper's experience by delivering improved customer services and offering digital content through websites. As mobile devices have become more common, many companies have sought to provide digital information about products to customers directly on their mobile device through websites or applications on the device. In this way, companies have been able to better deliver specific product information to customers based on the customer's browsing history, previous search terms, and related products, to name a few. However, these methods do not necessarily reflect the customer's real time product interests while they are shopping.

Proximity-detection technology allows companies to interact personally with customers by triggering location specific content and alerts to their mobile devices. For example, several beacons placed at various locations on a vehicle would be able to tell shoppers at a dealership about features and specifications of the vehicle. As a customer browsed a parking lot of vehicles at a dealership, the customer's mobile device could be provided with product details of the specific vehicle the customer is near, reflecting the customer's actual interest in the vehicle.

Accordingly, it is desirable to provide systems and methods for delivering product information to a mobile device. It is additionally desirable to deliver this information based on the proximity of the mobile device relative to the product. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for delivering product information to a mobile device. In one non-limiting example, a system for delivering product information to a mobile device includes, but is not limited to, a beacon having a transmitter that is configured to transmit a product identification key to the mobile device over a first communication channel. The system further includes, but is not limited to, a remote server having a database of detailed product information including detailed product information corresponding to the product identification key. The remote server is configured to transmit the detailed product information to the mobile device over a second communication channel. The system further includes, but is not limited to, an application on the mobile device configured to request, over the second communication channel, the detailed product information from the remote server based on the product identification key, received over the first communication channel, and display the detailed product information.

In another non-limiting example, a vehicle having a system for delivering product information to a mobile device includes, but is not limited to, a beacon having a transmitter that is configured to transmit a product identification key to the mobile device over a first communication channel. The system further includes, but is not limited to, a remote server having a database of detailed product information including detailed product information corresponding to the product identification key. The remote server is configured to transmit the detailed product information to the mobile device over a second communication channel. The system further includes, but is not limited to, an application on the mobile device configured to request, over the second communication channel, the detailed product information from the remote server based on the product identification key, received over the first communication channel, and display the detailed product information.

In another non-limiting example, a method is provided for delivering product information to a mobile device. The method includes, but is not limited to, transmitting, with a beacon, a product identification key to the mobile device over a first communication channel. The method further includes, but is not limited to, opening an application on the mobile device based on the product identification key. The method further includes, but is not limited to, requesting, with the application, detailed product information corresponding to the product identification key, from a remote server over a second communication channel. The method further includes, but is not limited to, displaying, with the application, the detailed product information on the mobile device.

DESCRIPTION OF THE DRAWINGS

The disclosed examples will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
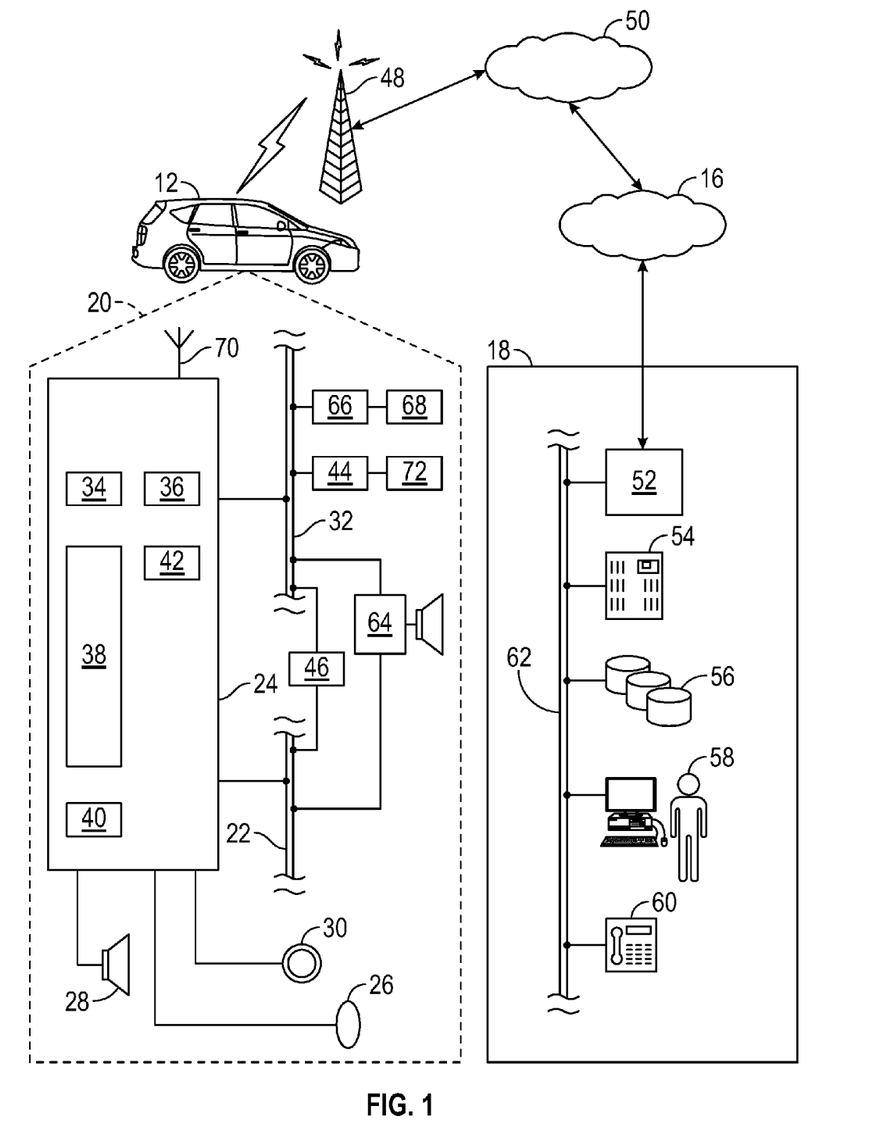
FIG. 1 is a diagram illustrating a non-limiting example of a communication system.

With reference to FIG. 1, there is shown a non-limiting example of a communication system 10 that may be used together with examples of the apparatus/system disclosed herein or to implement examples of the methods disclosed herein. Communication system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GNSS chipset/component 42. In one example, the wireless modem 36 includes a computer program and/or set of software routines adapted to be executed within electronic processing device 38.

The telematics unit 24 may provide various services including: turn-by-turn directions and other navigation-related services provided in conjunction with the GNSS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc.

Dual mode antenna 70 services the GNSS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a call center 18 that is manned, it will be appreciated that the call center 18 can be any central or remote facility, manned or unmanned, mobile or fixed, to or from which it is desirable to exchange voice and data.

Figure 2A:
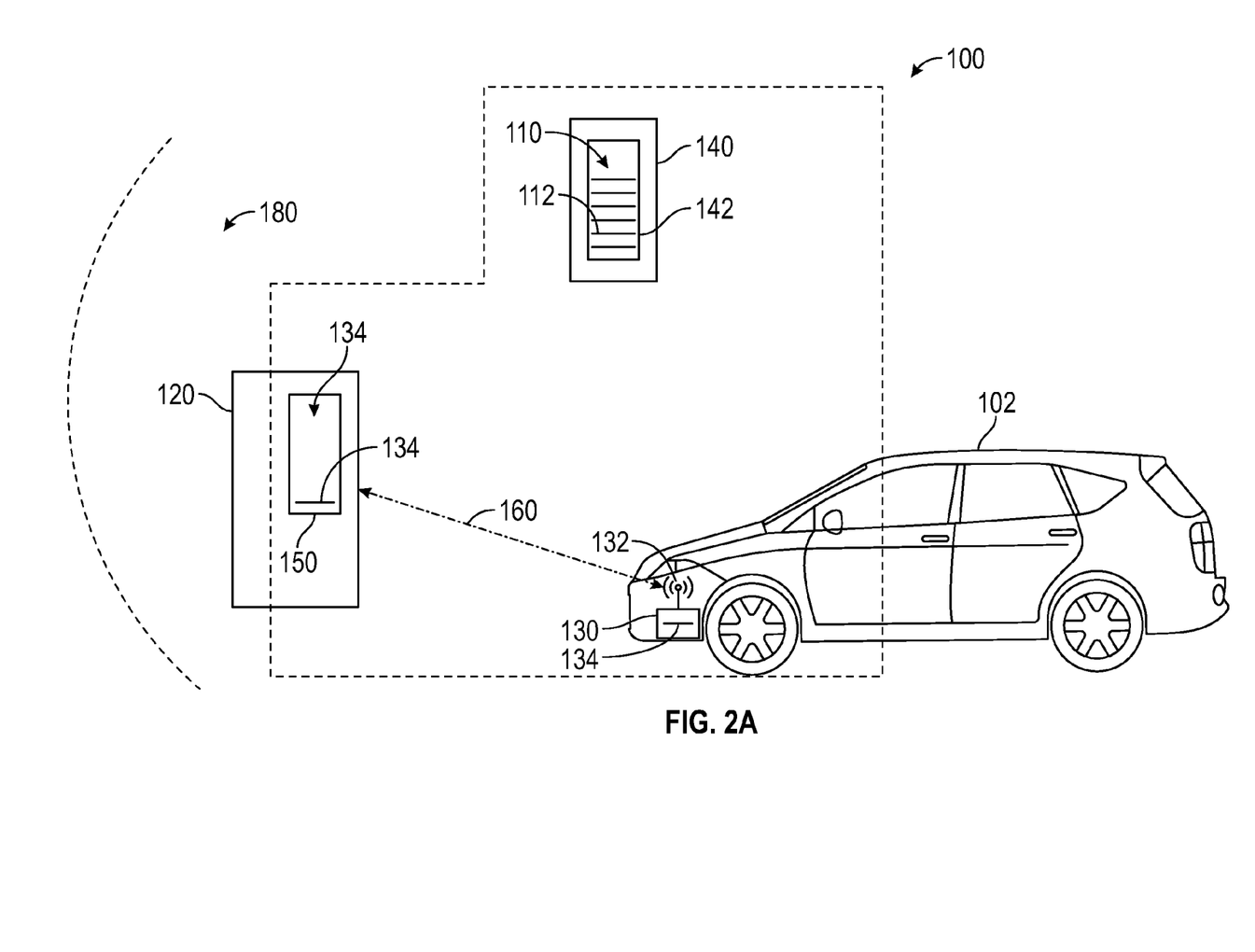
FIGS. 2A-C are diagrams illustrating a non-limiting example of a system for delivering product information to a mobile device according to an embodiment.
Figure 2B:
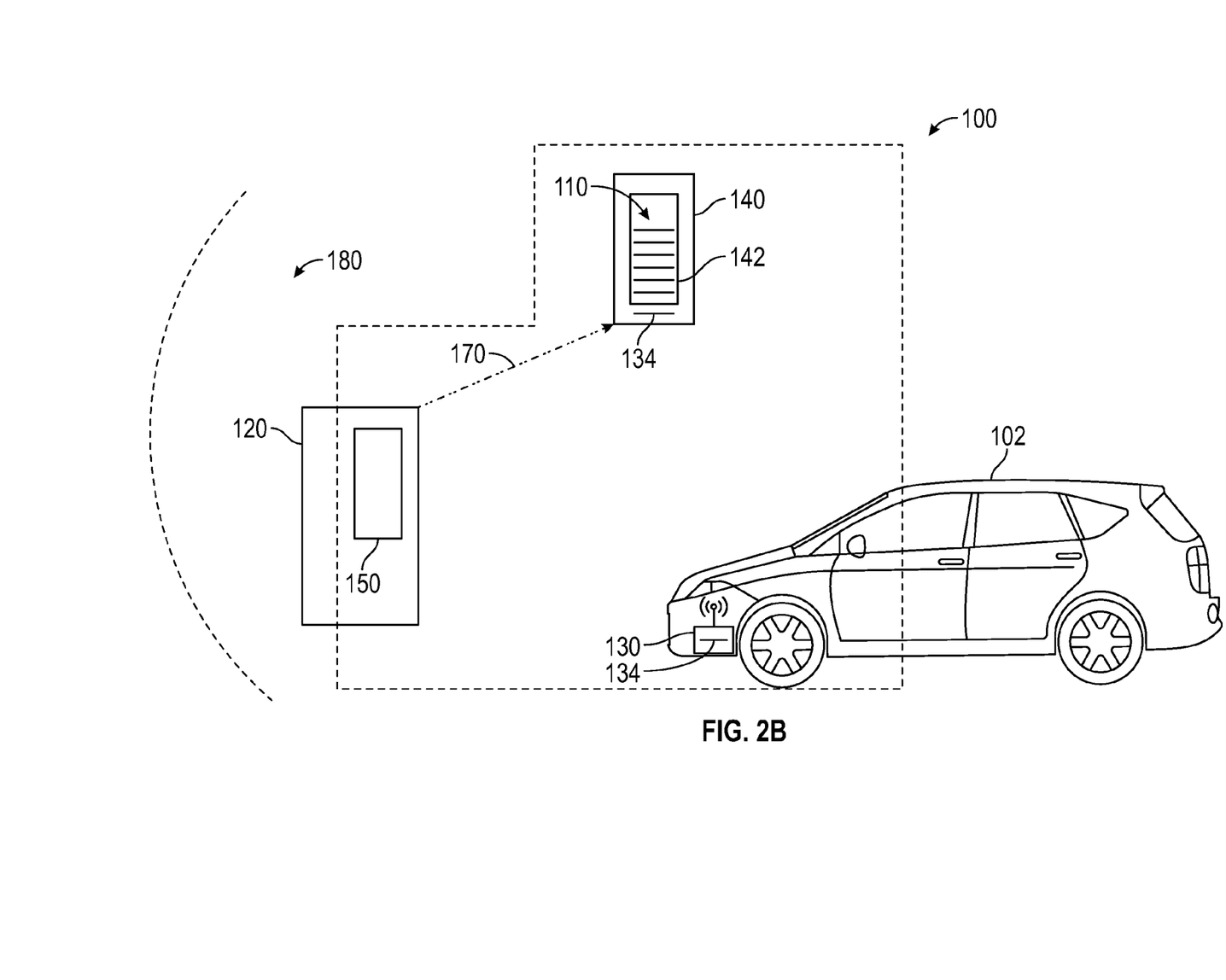
Figure 2C:
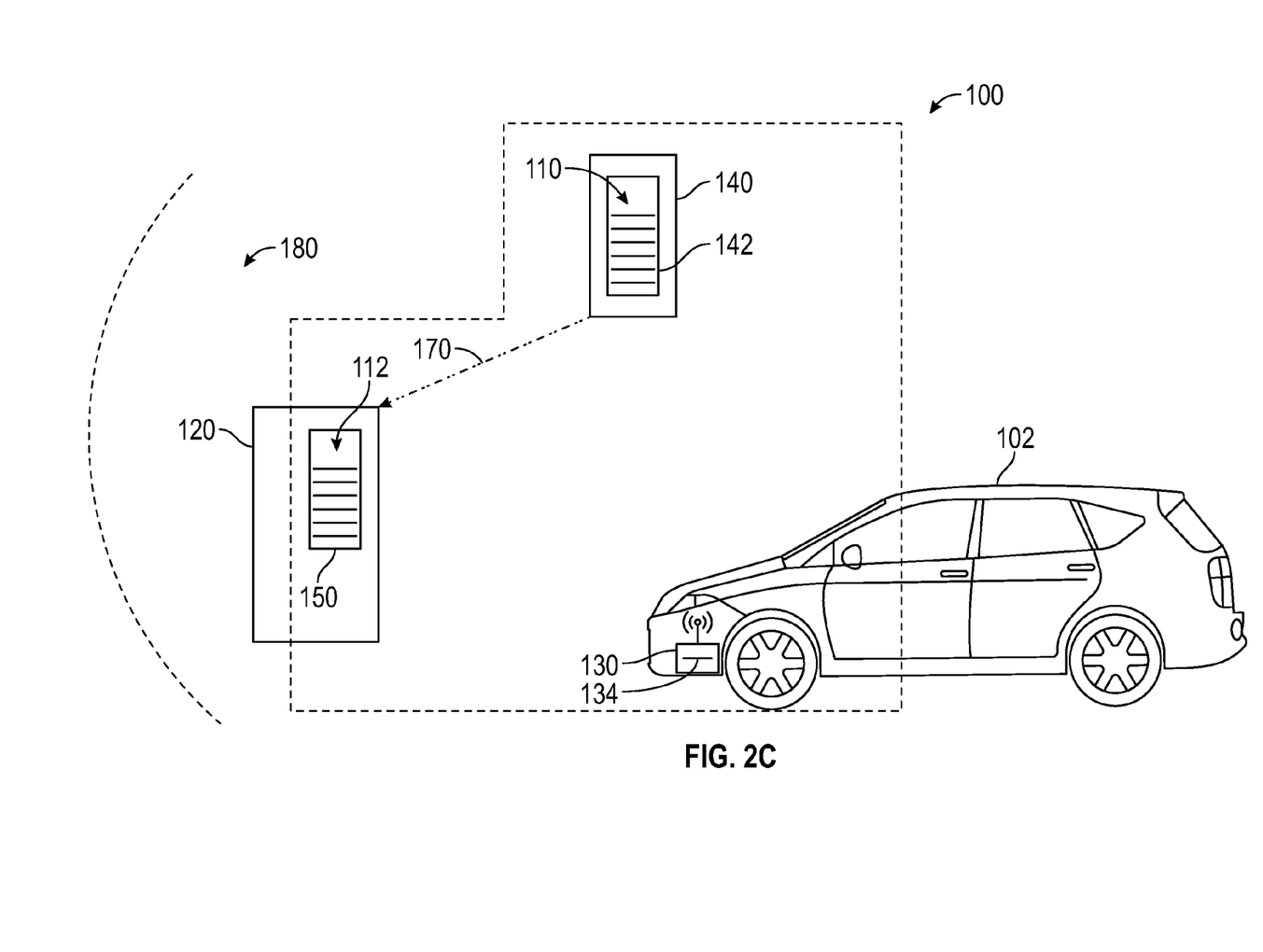
Figure 3:
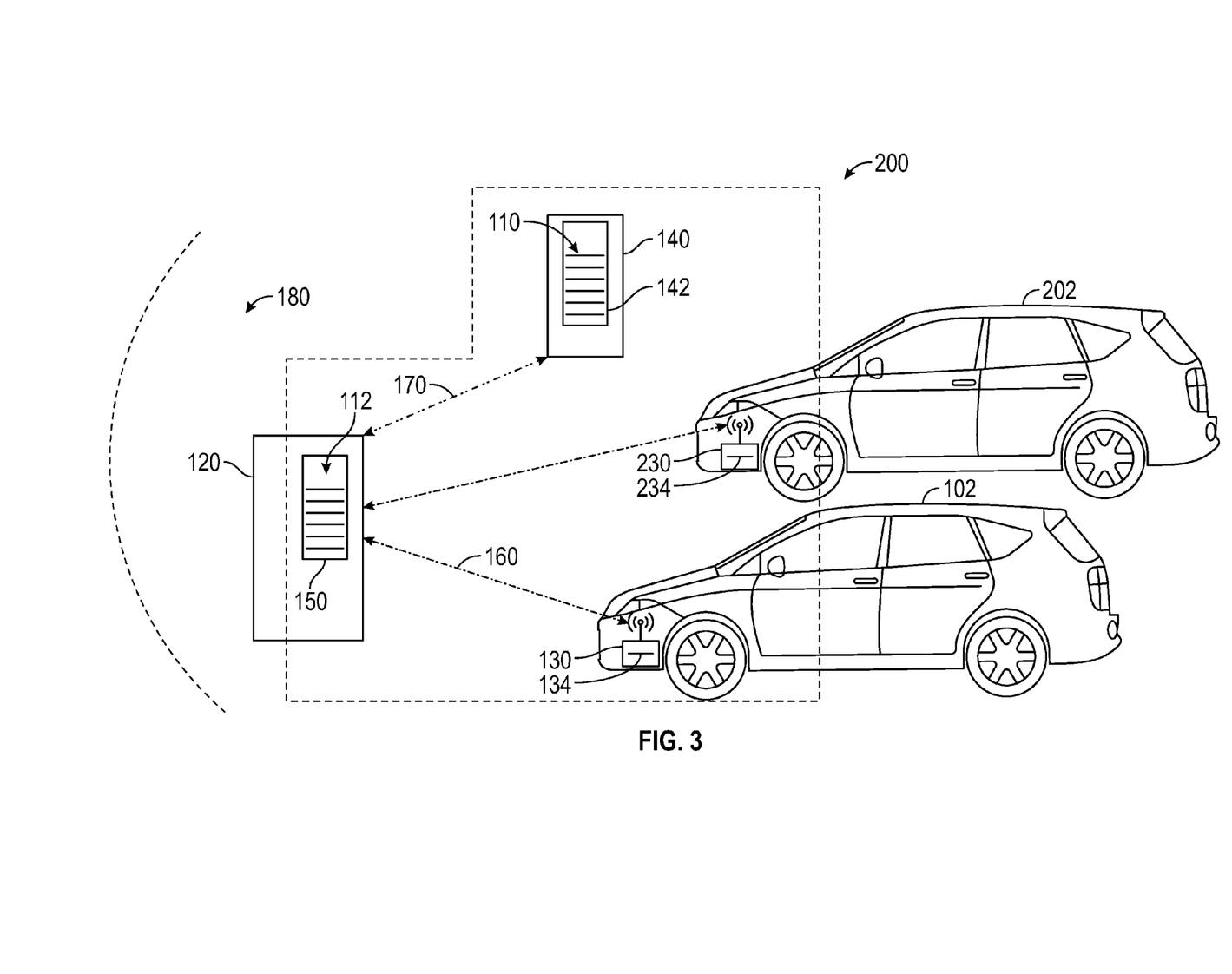
FIG. 3 is a diagram illustrating a non-limiting example of a vehicle having a system for delivering product information to a mobile device according to another embodiment.
Figure 4:
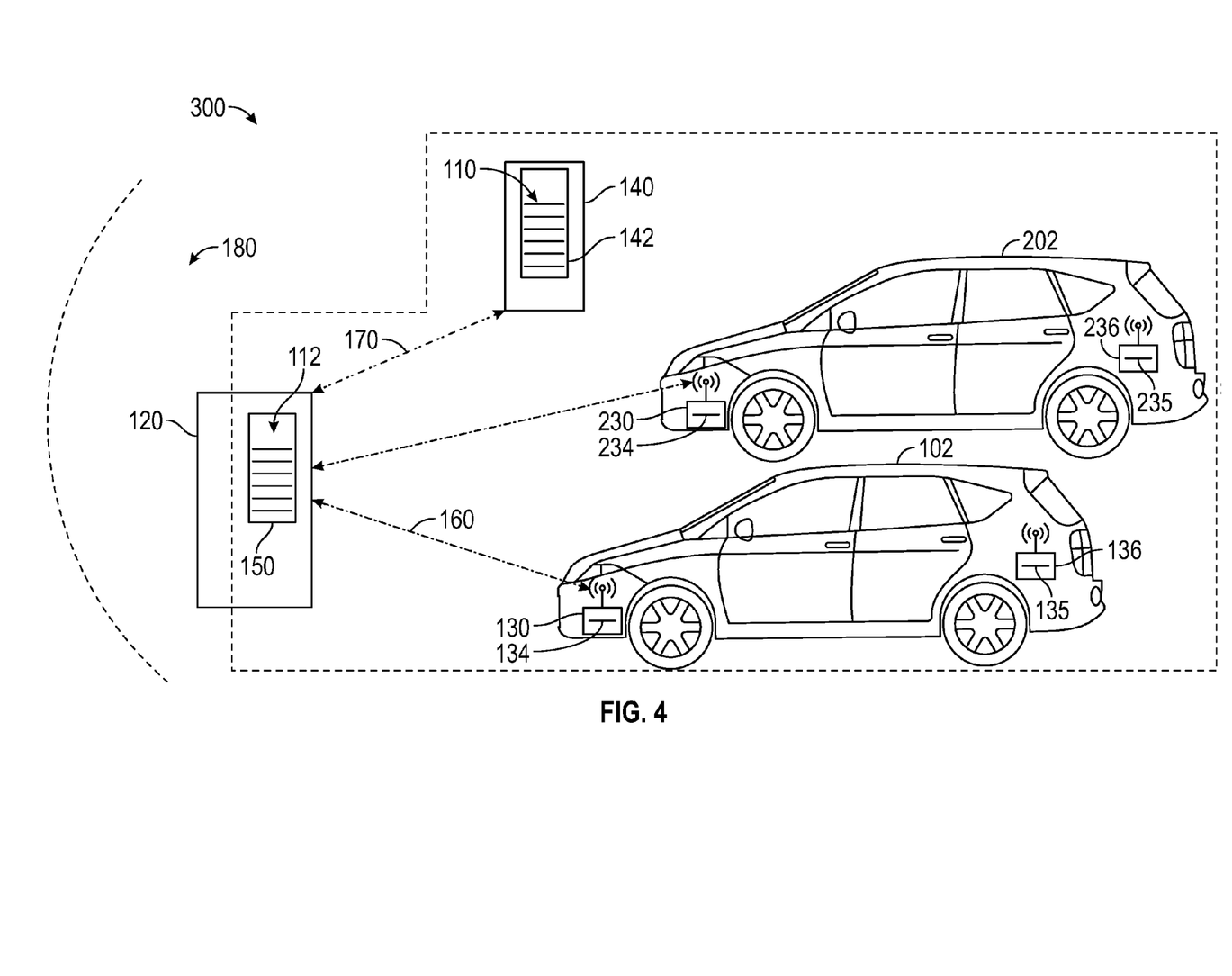
FIG. 4 is a diagram illustrating a non-limiting example of a vehicle having a system for delivering product information to a mobile device according to another embodiment.

With reference to FIGS. 2-4, there is shown a non-limiting example of a system 100 for delivering vehicle information 110 to a mobile device 120. It should be appreciated that the overall architecture, setup and operation, as well as the individual components of the illustrated system 100 are merely exemplary and that differently configured systems may also be utilized to implement the examples of the system 100 disclosed herein. Thus, the following paragraphs, which provide a brief overview of the illustrated system 100, are not intended to be limiting.

The system 100 for delivering product information 110 to a mobile device 120 generally includes a beacon 130, a remote server 140, and an application 150 on the mobile device 120. As shown in FIG. 2A, the beacon 130 has a transmitter 132 and is configured to transmit a product identification key 134 to the mobile device 120 over a first communication channel 160. The remote server 140 has a database 142 of detailed product information 110 including detailed product information 112 that corresponds to the product identification key 134. As shown in FIG. 2A, the application 150 on the mobile device 120 receives the product identification key 134. The application 150 is configured to request, over a second communication channel 170, the detailed product information 112 from the remote server 140 based on the product identification key 134, received over the first communication channel 160, as shown in FIG. 2B. The remote server 140 is configured to transmit the detailed product information 112 that corresponds to the product identification key 134 to the mobile device 120 over a second communication channel 170 as shown in FIG. 2C. The application 150 is further configured to display the detailed product information 112 to a user of the mobile device 120.

In a non-limiting embodiment of the system 100, the beacon 130 is positioned within a vehicle 102. Vehicle 102 may be any type of mobile vehicle such as a car, truck, recreational vehicle (RV), boat, plane, etc., and is equipped with at least one beacon 130. In a non-limiting embodiment of the system 100, the beacon 130 is onboard the vehicle 102 and further coupled to a vehicle bus (not shown). Examples of suitable vehicle busses include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

In a non-limiting embodiment, the first communication channel 160 is a wireless protocol and includes at least one of a Bluetooth low power protocol, a Bluetooth protocol, a ZigBee protocol, an iBeacon protocol, an Eddystone protocol, a near field communication protocol, or a combination thereof. One skilled in the art will appreciate that the transmitter 132 is configured to communicate over a combination of the previously disclosed wireless protocols. Likewise the mobile device 120 is configured to communicate over the first communication channel 160.

In a non-limiting embodiment, the product identification key 134 transmitted by the beacon 130 includes a universally unique identifier (UUID), a uniform resource locator (URL), or a combination thereof. In a non-limiting embodiment, the UUID is a value that is used to uniquely identify a product. In a non-limiting embodiment, the UUID identifies the specific make and model of the vehicle 102 and the features, equipment, options, etc., installed on the vehicle 102, similar to a vehicle manufacturer window sticker. In a non-limiting embodiment, a combination of the UUID, a major number, and a minor number uniquely identify the vehicle 102. In a non-limiting embodiment, the URL is a web address that identifies the vehicle 102 with a web page listing off the features of the vehicle 102 as detailed above.

In a non-limiting embodiment, the product identification key 134 is programmed into the beacon 130 based on the product features. However, one skilled in the art will appreciate that any value of vehicle identification key may be associated with the detailed vehicle information 112 independent of the exact value of the vehicle identification key. By way of example and for understanding, a beacon 130 having a vehicle identification key of "12345" may be installed on any model of vehicle and the detailed vehicle information 112 corresponding to the specific vehicle 102 is later associated with that vehicle identification key.

The beacon 130 is shown generally in the front of the vehicle 102. One skilled in the art will appreciate that the beacon 130 may be placed in any number of locations within the vehicle 102 and that the location depicted herein should not be limiting. The specific location of the beacon 130 within the vehicle 102 may be chosen based on available space, ease of access, or other factors and the location within the vehicle 102 is ultimately a design choice.

In a non-limiting embodiment, the beacon 130 further includes a power source (not shown) such as a battery. In a non-limiting embodiment, the beacon 130 is configured to transmit the product identification key 132 according to a predetermined interval. One skilled in the art will appreciate that the beacon 130 is a standalone component that may be integrated with the vehicle 102 bus, as detailed above, or installed separately. By keeping the beacon 130 as a standalone component, the beacon 130 may be installed while the vehicle 102 is being manufactured or at another time, such as when the vehicle 102 is in a dealer lot or advertised for sale.

The remote server 140 has a database 142 that includes the detailed product information 110 including the detailed production information 112 that corresponds to the product identification key 134. The term "server," as used herein, generally refers to electronic component, as is known to those skilled in the art, such as a computer program or a machine that waits for requests from other machines or software (clients) and responds to them. In a non-limiting example, the remote server 140 waits for a request from the mobile device 120 and responds to the mobile device 120 with the detailed product information 112. The remote server 140 communicates with the mobile device 120 over the second communication channel 170. The second communication channel 170 may be a wireless data channel, such as those used by mobile phones to access the Internet, however the specific protocol used to communicate between the remote server 140 and the mobile device is not contemplated by the present disclosure.

The application 150 is installed on the mobile device 120. One skilled in the art will appreciate that the application 150 may be configured to operate on any number of mobile devices including those that use iOS, Android, Windows, or any number of operating systems. The mobile device 120 receives the product identification key 134 and then the application 150 requests the detailed product information 112 from the remote server 140 based on the product identification key 134. The application 150 displays the detailed product information 112 so that a user (not shown) of the mobile device 120 can review the detailed product information 112.

In this way, the system 100 delivers detailed product information 112 to the mobile device 120. By way of a non-limiting example, a user of the mobile device 120 approaches the vehicle 102 having the beacon 130. The beacon transmits the product identification key 134 to the mobile device 120 over the first communication channel 160. The application 150 on the mobile device 120 communicates over the second communication channel 170 with the remote server 140 and requests the detailed product information 112 based on the product identification key 134. The remote server 140 transmits the detailed product information 112 to the mobile device 120 and the application 150 displays the detailed product information 112 to the user of the mobile device 120.

In a non-limiting embodiment of the system 100, the mobile device 120 is configured to accept the product identification key 134 before requesting the detailed product information 112. In a non-limiting embodiment, the mobile device 120 receives a push notification or other alert to indicate that the beacon 130 has transmitted the product identification key 134 to the mobile device 120. The user of the mobile device 120 can accept the request which then allows the application 150 to request the detailed product information 112. If the request is denied, the application 150 does not request the detailed product information 112.

In a non-limiting embodiment, the application 150 automatically accepts the product identification key 134 from the beacon 130 and requests the detailed product information 112. By way of example, the user of the mobile device 120 installs the application 150 on the mobile device 120 and opts in to receiving detailed product information 112 without the need to affirmatively accept the request. Stated differently, when the user installs the application 150 on the mobile device 120, the user accepts to receive future detailed product information 112.

In a non-limiting embodiment, the application 150 maintains a cache of detailed product information 112 on the mobile device 120. In a non-limiting embodiment, the application stores detailed product information 112 corresponding to a plurality of vehicles 102. In this way, the application 150 may not have to request detailed vehicle information 112 from the remote server 140 every time the product identification key 134 is received.

In a non-limiting embodiment of the system 100, the mobile device 120 is configured to scan a proximate area 180 for beacons 130 that are able to communicate over the first communication channel 160 before receiving the product identification key 134. One skilled in the art will appreciate that the mobile device 120 may not always be receiving the product identification key 134 over the first communication channel 160 and that first scanning the proximate area 180 will allow the mobile device 120 to save power. One skilled in the art will further appreciate that the wireless protocols detailed above have features that allow for this type of scanning. In a non-limiting embodiment, the proximate area 180 is the range of the transmitter 132 of the beacon 130, although one skilled in the art will appreciate that the specific range and size of the proximate area 180 will depend on the type of transmitter 132 used in the beacon 130, the specific protocol used, location of the beacon 130 in the vehicle 102, etc., and is not contemplated by the present disclosure.

With reference now to FIG. 3 and with continued reference to FIG. 2, there is shown a non-limiting example of a system 200 for delivering product information 110 to a mobile device 120. It should be appreciated that the overall architecture, setup and operation, as well as the individual components of the illustrated system 200 are merely exemplary and that differently configured systems may also be utilized to implement the examples of the system 200 disclosed herein. Thus, the following paragraphs, which provide a brief overview of the illustrated system 200, are not intended to be limiting. As similar components are used in the system 200 relative to the system 100, similar reference numerals will be used and the description of system 200 will focus on the differences relative to the system 100.

Relative to system 100, system 200 for delivering product information 110 to the mobile device 120 further includes a second vehicle 202 having a second beacon 230. In this way, the system 200 demonstrates an embodiment in which a mobile device 120 is proximate to a plurality of vehicles 102, 202 each having a beacon 130, 230. In the embodiment of the system in FIG. 3, each of the beacons has a unique product identification key 134 and is configured to communicate over the first communication channel 160.

In a non-limiting embodiment, each of the beacons 130, 230 transmits their own product identification key 134, 234 to the mobile device 120. The application 150 displays the vehicles 102, 202 that are proximate to the user and then requests detailed product information 112 from the remote server 140 based on a selection made by the user. Stated differently, the application 150 displays to the user the vehicles 102, 202 that are proximate to the user and the user selects to view the detailed product information 112.

In a non-limiting embodiment, the mobile device 120 is configured to determine a distance to each of the beacons 130, 230. The application 150 requests detailed product information 112 for the beacons 130, 230 having distances within a predetermined distance to the mobile device 120. As depicted in FIG. 3, vehicle 102 is closer to the mobile device 120 than vehicle 202. By way of example, such a situation may occur when a user of a mobile device 120 is browsing vehicles 102, 202 within a dealer lot. In this situation, the system 200 may only request detailed product information 112 of the most proximate vehicles 102, 202 to the mobile device 120. Stated differently, even though multiple vehicles may be within the proximate area 180 around the mobile device 120, the application 150 requests detailed product information 112 corresponding to the beacons 130, 230 within a predetermined distance to the mobile device 120. In a non-limiting embodiment, the predetermined distance is less than the proximate area 180 of the beacons 130, 230 and, more specifically, the predetermined distance is set such that the application 150 does not request detailed product information 112 for all of the vehicles 102, 202 within the proximate area 180. In a non-limiting embodiment, the predetermined distance is less than one hundred feet, although one skilled in the art will appreciate that the predetermined distance may be set based on design considerations, how the vehicles are stored, the arrangement of the vehicles, and other considerations.

In a non-limiting embodiment, the application 150 is configured to scan the proximate area 180 for beacons 130, 230 that are able to communicate over the first communication channel 160 and accepts product identification keys 134, 234 from the beacons 130, 230. In this embodiment, the application 150 identifies beacons 130, 230 within the proximate area 180 and accepts the product identification keys 134, 234, rather than receiving them automatically.

In a non-limiting embodiment, the application 150 is configured to accept the product identification keys 134, 234 based on the overall distance of the vehicle 102, 202 from the mobile device 120. As an alternative to the embodiment described above, the application 150 may be set to accept product identification keys 134, 234 from vehicles 102, 202 and beacons 130, 230 that are within a set distance from the mobile device 120. In a non-limiting example, the application 150 may accept product identification keys 134, 234 from vehicles 102, 202 that are within ten feet of the mobile device 120, although one skilled in the art will appreciate that the overall distance may be set to any number of values without departing from the spirit of the present disclosure.

With reference now to FIG. 4 and with continued reference to FIGS. 2 and 3, there is shown a non-limiting example of a system 300 for delivering product information 110 to a mobile device 120. It should be appreciated that the overall architecture, setup and operation, as well as the individual components of the illustrated system 300 are merely exemplary and that differently configured systems may also be utilized to implement the examples of the system 300 disclosed herein. Thus, the following paragraphs, which provide a brief overview of the illustrated system 300, are not intended to be limiting. As similar components are used in the system 300 relative to the systems 100, 200 similar reference numerals will be used and the description of system 300 will focus on the differences relative to the systems 100, 200.

Relative to systems 100, 200, system 300 for delivering product information 110 to the mobile device 120 further includes a first vehicle 102 having a pair of beacons 130, 136 and a second vehicle 202 having a pair of beacons 230, 236. Each of the beacons 130, 136 in the first vehicle 102 have a product identification key 134, 135. Similarly, each of the beacons 230, 236 in the second vehicle 202 have a product identification key 234, 235. In this way, the system 300 demonstrates an embodiment in which a mobile device 120 is proximate to a plurality of vehicles 102, 202 each having a plurality of beacons 130, 136, 230, 236. In the embodiment of the system in FIG. 4, each of the beacons is configured to communicate over the first communication channel 160.

As detailed above, the mobile device is configured to determine a distance to the beacons beacons 130, 136, 230, 236. In the non-limiting embodiment of the system 300 of FIG. 4, the beacons 130, 136, 230, 236 are placed on distant ends of the vehicles 102, 202 to determine an overall vehicle distance from the mobile device 120. In a non-limiting embodiment, the distance is determined based on the strength of the signal received over the first communication channel 160. In this way, as shown in FIG. 4, the beacons 130, 136, 230, 236 can be used to triangulate a distance of the vehicle 102, 202 from the mobile device 120.

By way of example, the mobile device 120 is closest to beacon 130 and further away from beacons 136, 230, 236. In a non-limiting embodiment, the system 300 identifies that the mobile device 120 is not only closer to vehicle 102 than vehicle 202, but that the mobile device 120 is closer beacon 130 than beacon 136. In a non-limiting example, this could in turn indicate that the user is interested in a specific feature of the vehicle 102 near beacon 130, such as the engine of the vehicle 102. One skilled in the art will appreciate that additional beacons may be placed around the vehicle 102, 202 such that the detailed product information 112 delivered to the mobile device 120 may call out the specific feature that is associated with the beacon 130, 136, 230, 236 most proximate to the mobile device 120.

In a non-limiting embodiment, the product identification keys 134, 135 of the first vehicle 102 both correspond to detailed product information 112 for the first vehicle 102. In a non-limiting embodiment, the product identification keys 134, 135 are the same key, such that the same detailed product information 112 would be transmitted by the remote server 140 regardless of which product identification key 134, 135 was received by the mobile device 120. In a non-limiting embodiment, the product identification keys 134, 135 are different keys, such different detailed product information 112 would be transmitted by the remote server 140 based on which product identification key 134, 135 was received by the mobile device 120. For example, as detailed above, the product identification key 134 could correspond to engine information while product identification key 135 could correspond to cargo capacity information. Product information keys 234, 235 may similarly be selected and varied as detailed above with respect to product information keys 134, 135.

Figure 5:
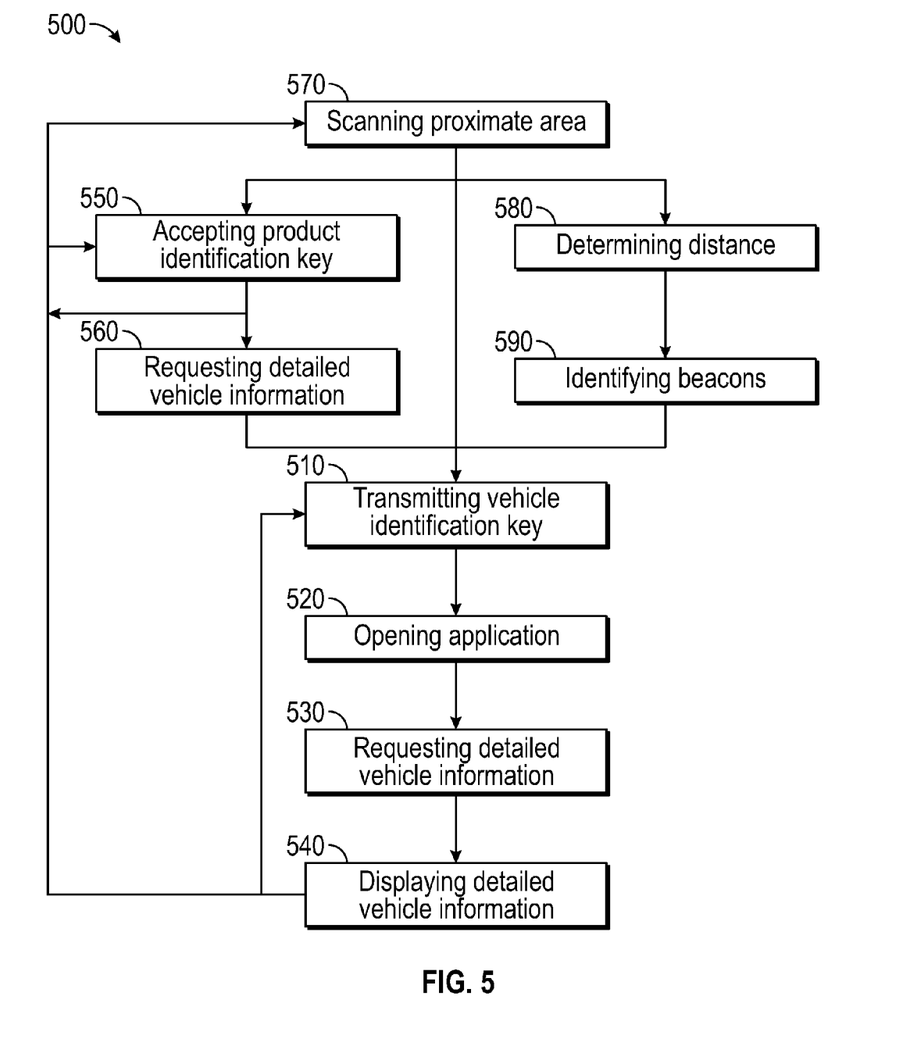
FIG. 5 is a flowchart illustrating a non-limiting example of a method for delivering product information to a mobile device.

Referring now to FIG. 5, and with continued reference to FIGS. 2-4, a flowchart illustrates a method 500 for delivering product information to a mobile device in accordance with the present disclosure. In a non-limiting embodiment, the method 500 is performed by the systems 100, 200, 300 detailed above. As can be appreciated in light of the disclosure, the order of operation within the method 300 is not limited to the sequential execution as illustrated in FIG. 5, but may be performed in one or more varying orders as applicable and in accordance with the requirements of a given application.

In various exemplary embodiments, the method 500 is run based on predetermined events, and/or can run continuously during operation of the systems 100, 200, 300. The method 500 starts at 510 with transmitting, with a beacon, a product identification key to a mobile device over the first communication channel. In a non-limiting embodiment, a beacon 130, 136, 230, 236 transmits the product identification key 134, 135, 234, 235 to the mobile device 120 over the first communication channel 160 of the previously discussed systems 100, 200, 300.

At 520, the method 500 opens an application on the mobile device based on the product identification key. In a non-limiting embodiment, an application 150 is opened on the mobile device 120 of the previously discussed systems 100, 200, 300.

At 530, the application requests detailed product information from a remote server corresponding to the product identification key over the second communication channel. In a non-limiting embodiment, the application 150 requests the detailed product information 112 from the remote server 140 over the second communication channel 170 of the previously discussed systems 100, 200, 300.

At 540, the application displays the detailed product information on the mobile device. In a non-limiting embodiment, the application 150 displays the detailed product information 112 on the mobile device 120 of the previously discussed systems 100, 200, 300. The method 500 then proceeds to 510 and transmits additional product identification keys as necessary.

In a non-limiting embodiment, the method 500 further includes 550 and the mobile device accepts the product identification key over the first communication channel. In a non-limiting embodiment, the mobile device 120 accepts the product identification key 134, 135, 234, 235 over the first communication channel 160 of the previously discussed systems 100, 200, 300.

At 560, the application requests the detailed product information based on the acceptance of the product identification key. In a non-limiting embodiment, the application 150 requests the detailed product information 112 based on the acceptance of the product identification key 134, 135, 234, 235 of the previously discussed systems 100, 200, 300.

In a non-limiting embodiment, the method 500 further includes 570 and scans, by the mobile device a proximate area for beacons that are able to communicate over the first communication channel. In a non-limiting embodiment, the mobile device 120 scans the proximate area 180 for beacons 130, 136, 230, 236 that are able to communicate over the first communication channel 160 of the previously discussed systems 100, 200, 300. The method 500 then proceeds to 550 and waits for an acceptance of the product information key or proceeds to 510 and receives the product identification key, as detailed above.

In a non-limiting embodiment, the method further includes 580 and determines, by the mobile device a distance to each of the plurality of beacons. At 590 the beacons within a predetermined distance are identified and the method 500 proceeds to 510 and transmits the product identification key. In a non-limiting embodiment, the mobile device 120 determines a distance to each of a plurality of beacons 130, 136, 230, 236 of the previously discussed systems 100, 200, 300. The beacons 130, 136, 230, 236 within a predetermined distance are identified and the mobile device 120 receives the product identification key 134, 135, 234, 235 of the identified beacons 130, 136, 230, 236 of the previously discussed systems 100, 200, 300.

While various exemplary embodiments have been presented in the foregoing detailed description, it should be appreciated that a vast number of variations exist. It should also be appreciated that the exemplary embodiments are only examples, and are not intended to limit the scope, applicability, or configuration of the disclosure in any way. Rather, the foregoing detailed description will provide those skilled in the art with a convenient road map for implementing the exemplary embodiments. It should be understood that various changes can be made in the function and arrangement of elements without departing from the scope of the disclosure as set forth in the appended claims and the legal equivalents thereof.

The invention claimed is:

1. A system for delivering product information to a mobile device, the system comprising:
a beacon having a transmitter configured to transmit a product identification key to the mobile device over a first communication channel;
a remote server having a database of detailed product information including detailed product information corresponding to the product identification key, the remote server configured to transmit the detailed product information to the mobile device over a second communication channel; and
an application on the mobile device configured to request, over the second communication channel, the detailed product information from the remote server based on the product identification key, received over the first communication channel, and display the detailed product information,
wherein the mobile device is configured to scan a proximate area for beacons that are configured to communicate over the first communication channel before receiving the product identification key from beacons within the proximate area.

2. The system of claim 1, wherein the first communication channel is a wireless protocol selected from the group consisting of: a Bluetooth low power protocol, a Bluetooth protocol, a ZigBee protocol, an iBeacon protocol, an Eddystone protocol, a near field communication protocol, or a combination thereof.

3. The system of claim 1, wherein the product identification key is selected from the group consisting of: a universally unique identifier (UUID), a major number, a minor number, a uniform resource locator (URL), or a combination thereof.

4. The system of claim 1, wherein the mobile device is configured to accept the product identification key before requesting the detailed product information.

5. The system of claim 1, further comprising a plurality of beacons, wherein the mobile device is configured to determine a distance to each of the beacons and receives the product information keys from the beacons having distances within a predetermined distance.

6. The system of claim 1, wherein the application is configured to scan a proximate area for beacons that are able to communicate over the first communication channel and requests the product identification key from beacons within the proximate area.

7. A vehicle comprising:
a plurality of beacons, each beacon of the plurality of beacons having a transmitter configured to transmit a product identification key to a mobile device over a first communication channel; and
a system for delivering product information to the mobile device, the system comprising:
a remote server having a database of detailed product information including detailed product information corresponding to the product identification key, the remote server configured to transmit the detailed product information to the mobile device over a second communication channel; and
an application on the mobile device configured to request, over the second communication channel, the detailed product information from the remote server based on the product identification key, received over the first communication channel, and display the detailed product information,
wherein the mobile device is configured to determine a distance to each of the beacons and receive the product information keys from the beacons having distances within a predetermined distance.

8. The vehicle of claim 7, wherein the first communication channel is a wireless protocol selected from the group consisting of: a Bluetooth low power protocol, a Bluetooth protocol, a ZigBee protocol, an iBeacon protocol, an Eddystone protocol, a near field communication protocol, or a combination thereof.

9. The vehicle of claim 7, wherein the product identification key is selected from the group consisting of: a universally unique identifier (UUID), a major number, a minor number, a uniform resource locator (URL), or a combination thereof.

10. The vehicle of claim 7, wherein the mobile device is configured to scan a proximate area for beacons that are able to communicate over the first communication channel before receiving the product identification key from beacons within the proximate area.

11. The vehicle of claim 7, wherein the application is configured to request the product identification key based on the distance.

12. A method for delivering product information to a mobile device, the method comprising:
scanning, by the mobile device, a proximate area for beacons that are able to communicate over a first communication channel;
transmitting, with a beacon, a product identification key to the mobile device over the first communication channel;
opening an application on the mobile device based on the product identification key;
requesting, with the application, detailed product information corresponding to the product identification key, from a remote server over a second communication channel, wherein the remote server has a database of detailed product information including detailed product information corresponding to the product identification key; and
displaying, with the application, the detailed product information on the mobile device.

13. The method of claim 12, wherein the first communication channel is a wireless protocol selected from the group consisting of: a Bluetooth low power protocol, a Bluetooth protocol, a ZigBee protocol, an iBeacon protocol, an Eddystone protocol, a near field communication protocol, or a combination thereof.

14. The method of claim 12, wherein the product identification key is selected from the group consisting of: a universally unique identifier (UUID), a major number, a minor number, a uniform resource locator (URL), or a combination thereof.

15. The method of claim 12, further comprising:
accepting, by the mobile device, the product identification key; and
requesting the detailed product information based on the acceptance.

16. The method of claim 12, further comprising:
determining, by the mobile device, a distance to each of a plurality of beacons; and
identifying the beacons within a predetermined distance.

* * * * *